May 10, 1927. 1,627,872

G. H. STRAYER

POWER ACTUATED BUCKET

Filed Dec. 2, 1925

INVENTOR.
Guy H. Strayer
BY
ATTORNEYS.

Patented May 10, 1927.

1,627,872

UNITED STATES PATENT OFFICE.

GUY H. STRAYER, OF BELLE VALLEY, PENNSYLVANIA.

POWER-ACTUATED BUCKET.

Application filed December 2, 1925. Serial No. 72,682.

This invention is designed to improve power-actuated clam shells. The more common manner of handling clam shells is through cable connections but greater flexibility is possible and greater capacity possible with an apparatus in which the members of the bucket are controlled by power delivered directly at the bucket. Such structures involve difficulties in that it is desirable to confine the mechanism within close limits as to space and its power advantages should be very great in order that the mechanism may be compact. The present invention satisfies these requirements in that I utilize an electric motor which transmits the power through a worm arranged lengthwise of the bucket thus keeping the mechanism within very compact limits but at the same time giving power which is amply sufficient to satisfy the operation of the bucket members. Features and details of the invention will appear from the specification and claims.

The invention is illustrated in the accompanying drawings as follows:—

Figure 1:
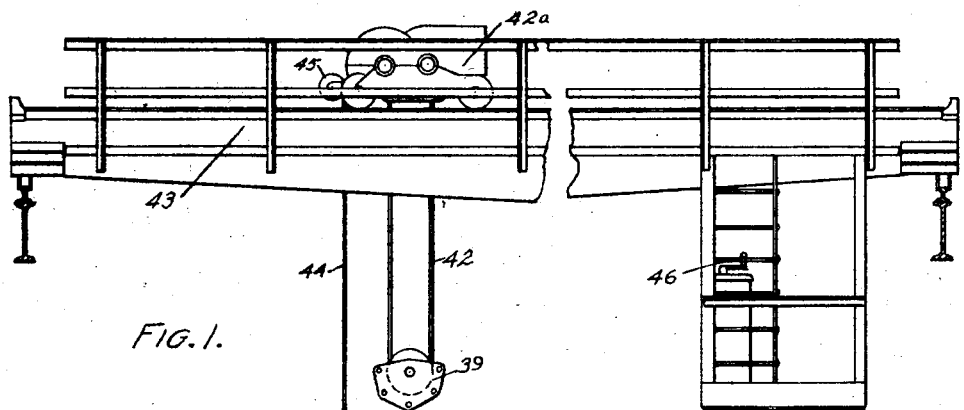

Fig. 1 shows a side elevation of a bucket installation.

Figure 2:
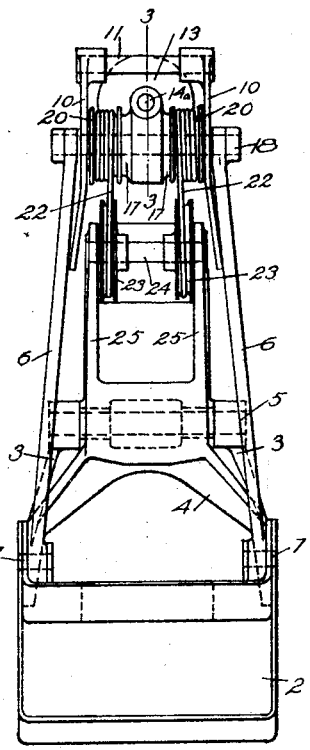

Fig. 2 an end view of the bucket.

Figure 3:
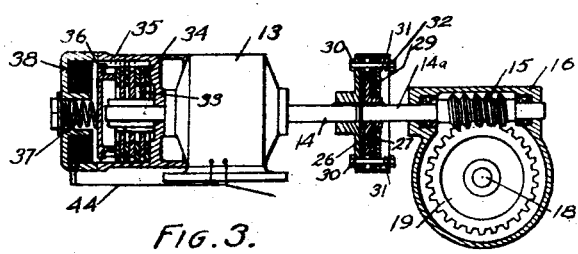

Fig. 3 a sectional view showing the driving mechanism.

Figure 4:
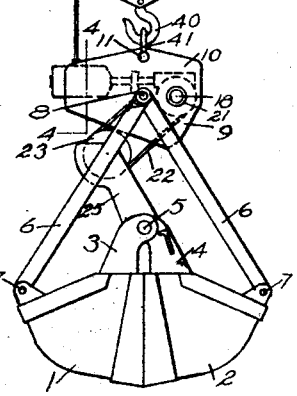

Fig. 4 a section on the line 4—4 in Fig. 1.

1 and 2 mark the bucket members. These are provided with arms 3 and 4 which are pivoted by a pin 5 in the usual manner. Links 6 are pivoted at 7 to the bucket members and on a pin 8 to a head 9. The head is formed with the side plates 10. These may be connected in any desirable manner as shown by a pin 11 and a U-shaped plate 12.

A motor 13 is mounted on the cross part of the U-plate 12 and has its driving shaft 14 extending lengthwise of the bucket. The shaft 14 is extended through a friction driving mechanism hereinafter described by a shaft 14ª and the shaft 14ª is journaled in a housing 16 within which the worm 15 is arranged. The housing has bearings 17 in which a shaft 18 is journaled. A worm gear 19 is fixed on the shaft 18 and sheaves 20 are fixed on the shaft 18 at each side of the worm gear 19. The shaft is mounted in bearings 21 in the frame plates 10. Cables 22 are anchored on the pin 8 and extend around sheaves 23 on extensions 25 from the arm 4. The cables then are wound on the sheaves 20.

It will readily be seen that as the worm gear is rotated the sheaves 20 are rotated and thus through the action of the cable force the closing of the bucket members. Not only is a power advantage given through a worm but there is also the power advantage through the action of the pulley involving the sheaves 23 and the return end of the cable. Preferably the pitch of the worm is such as to lock an opening movement of the bucket members through strain on the cables.

A yielding driving cable is arranged between the shaft 14 and 14ª. This involves a flange 26 secured to the shaft 14 and an opposing flange 27 secured to the shaft 14ª. A plate 29 is arranged on the opposite face of the flange 27 from the flange 26 and is in driving relation with the flange 26 through bolts 30 which extend through the flange 26 and plate 29 outside the periphery of the flange 27. Springs 31 are arranged on the bolts and adjusting nuts 32 provided so that the frictional engagement of the flange 26 and plate with the flange 27 may be made sufficient to carry the normal load from the shaft 14 to the shaft 14ª. With, however, any undue strain this connection will yield thus saving the motor and the mechanism. By putting this driving connection in the high speed shaft it can be made very much smaller than any other parts of the mechanism where there is a power advantage.

It is desirable to provide an electrically actuated brake in circuit with the motor so that when the motor stops the brake is set and when current is delivered to the motor the brake is relieved. Such brakes are of ordinary construction and involve discs 33 fixed on the shaft 14 alternating with discs 34 locked with an extension 35 on the motor case. A crowding plate 36 is arranged to force the discs into braking relation and is actuated by a spring 37. A solenoid 38 operates on the plate 36 to retract it against the spring and relieve the discs when current is passed through the solenoid. A conductor 44 for the motor 13 is in circuit with the solenoid and is carried by a take-up pulley.

A conventional mounting for the bucket is shown involving a pulley block 39 having its hook 40 arranged in a clevis 41, the clevis being secured on the pin 11. A hoisting cable 42 extends from a carriage 42ª and with its hoisting mechanism and the carriage is mounted on the crane beam 43. An operating cable 44 extends to a take-up pulley 45 and the current is controlled from the controlling stand of the crane and the control for the bucket is carried to an operating handle 46 on the operating platform of the crane so that the operator has a complete control of the opening and closing of the members. The motor is a reversing motor so that the worm may be reversed to drive the sheaves to permit the cables 22 to release the bucket members so that they may readily open.

What I claim as new is:—

1. In a power actuated bucket, the combination of bucket members; a head; rigid links connecting the head and members and maintaining the head in definite relation to the members; a worm gear mounted in the head and having its axis across the bucket; a sheave locked with the gear; a cable extending from the sheave and actuating said members; a worm actuating the gear and extending lengthwise of the bucket; and a motor mounted on the head in axial alinement with the worm and actuating the worm.

2. In a power actuated bucket, the combination of bucket members; a head; rigid links connecting the head and members and maintaining the head in definite relation to the members; a worm gear mounted in the head and having its axis across the bucket; sheaves arranged each side of the worm gear and locked therewith; cables extending from the sheaves and actuating said members; a worm actuating the gear, and having its axis lengthwise of the bucket; and a motor mounted on the head in axial alinement with the worm and actuating the worm.

3. In a power actuated bucket, the combination of pivoted bucket members; a head; rigid links connecting the outer edges of the bucket with the head; a power arm extending from one of the bucket members; a worm gear mounted on the head with its axis across the head; a sheave locked with the gear; a cable connection between the power arm and the sheave; a worm actuating the worm gear having its axis lengthwise of the head; and a motor mounted on the head in axial alinement with the worm and actuating the worm.

In testimony whereof I have hereunto set my hand.

GUY H. STRAYER.